United States Patent Office 2,913,422
Patented Nov. 17, 1959

2,913,422

CATALYST MANUFACTURE

Ronald E. Reitmeier, Anchorage, Ky., assignor to Chemetron Corporation, a corporation of Delaware No Drawing. Application July 5, 1956
Serial No. 595,866

10 Claims. (Cl. 252—465)

This invention relates generally to catalytic hydrogenation of petroleum stocks and fractions and more particularly to an improved cobalt-molybdenum-alumina catalyst suitable for hydrodesulfurization and other hydrogenation reactions and to the method of manufacturing such improved catalyst.

Many petroleum stocks contain sulfur compounds such as mercaptans, thiophenes and organic sulfides in small amounts, and these sulfur compounds have proved to be highly undesirable impurities, particularly when gasolines containing tetraethyl lead as an antiknock agent are to be produced. The presence of as little as about 0.05% sulfur in such fractions greatly increases the amount of tetraethyl lead which must be added in order to achieve a desired high octane rating. Accordingly, it has been found to be desirable to reduce the sulfur content to around 0.01%. Hydrodesulfurization is a convenient method of reducing the sulfur content to this range. This process involves reacting the organic sulfur compounds with hydrogen in the presence of a hydrogenation catalyst to convert the sulfur to hydrogen sulfide which may be readily separated from normally liquid fractions.

Compounds of cobalt and molybdenum have been used for many years for such hydrodesulfurization as well as other hydrogenation reactions, and, because both of these metals are costly, many different forms of supported catalysts in which minor amounts of the catalytic materials are incorporated on carrier material such as alumina have been developed.

In general these supported catalysts fall into three categories, namely: (1) those formed by coprecipitating compounds of the active metals and the alumina or other carrier from a single solution in order to form a gel of the carrier material having the catalytically active materials uniformly dispersed therein; (2) those formed by impregnation techniques where either or both the cobalt and molybdenum are deposited upon the carrier by impregnating the carrier with a solution or solutions of the active material; and (3) those formed by mechanically mixing the active components and the carrier and forming the mixture into catalyst pellets. Generally speaking, the coprecipitated type catalysts are the most difficult to manufacture but make the most effective use of the catalytic material by virtue of high degree of dispersion which is achieved.

Impregnated catalysts are easier to manufacture, but it is difficult to control the degree of dispersion, the distribution and the amount of the catalytically active material which is actually present in the catalyst. Moreover, when two catalytically active substances are present it is difficult to carry out a single impregnation of both materials, and if successive impregnations are employed, the number of steps in the manufacturing operation is increased often to the extent that the advantages inherent in the simpler operation of impregnation are lost.

The third type of operation, wherein the two active ingredients and the carrier are mechanically mixed in powder form and the mixed powder is formed into pellets, is, of course, the easiest to accomplish and has certain inherent advantages not possessed by the other methods. The exact amount of each ingredient present can be very readily controlled simply by weighing out the particulate material. Secondly, the distribution of the active material may be uniform throughout the pellets, and also stronger pellets can usually be obtained. This last point is particularly significant with catalysts which must be subjected to vigorous regeneration treatments from time to time in order to burn off polymer deposits and to restore activity.

Cobalt-molybdenum catalysts formed by mechanical mixing have not come in wide use heretofore, because they have been inherently less active than catalysts made by coprecipitation or impregnation procedures containing the same amount of active ingredients. Thus in order to obtain the required activity to effect a desired reaction in a catalyst prepared by dry mixing techniques, it has been necessary to utilize more of the costly active materials per unit volume of catalyst and less of the relatively inexpensive carrier. For this reason it has been more economical to employ impregnated catalysts in spite of the more costly manufacturing operations in order to be able to utilize less of the expensive ingredients.

I have discovered, however, a novel method of manufacturing supported cobalt-molybdenum catalysts which not only has all of the advantages accruing from mechanical mixing of the ingredients but also achieves such efficient utilization of the catalytically active ingredients that catalysts produced by my new method are surprisingly superior to conventional catalysts produced by impregnation or coprecipitation methods, though containing the same amounts of catalytically active materials. Moreover, the catalysts of my invention have great physical strength and will withstand repeated regenerations without deterioration.

In its simplest terms the process which I have discovered for producing my novel catalyst comprises forming pellets of an absorbent carrier material and cobalt molybdate, calcining the pellets, contacting the pellets with ammonia in the presence of water, and recalcining to remove the ammonia and water from the pellets. It is not known what the effect of ammoniation upon the cobalt molybdate containing pellets is, but repeated experiments have shown that the catalytic activity is greatly increased by such treatment. Other tests have demonstrated that ammoniation is not effective in increasing catalytic activity unless cobalt and molybdenum are present in the form of the salt cobalt molybdate whose formula, incidentally, may be written as either $CoMoO_4$ or $CoO.MoO_3$.

For some unknown reason catalysts made in mixing with a carrier material cobalt oxide or cobalt nitrate and molybdenum trioxide followed by pelleting and calcining are not appreciably benefited by ammoniation. Accordingly, I prefer to mix solid particulate cobalt molybdate with the carrier material as the initial step in the preparation of the catalyst. The carrier material preferably is a hydrated alumina such as that sold by the Aluminum Corporation of America and designated as Alcoa H-42. Such hydrated aluminas are converted to highly activated alumina upon calcination which drives off water of hydration. Usually calcination at high temperatures in the neighborhood of about 1500° F. should be avoided, or "dead burned" alumina may result. Accordingly, it is preferred to calcine the pellets of catalyst at lower temperatures around 900° F. to 1000° F.

The preferred carriers may consist entirely of alumina or they may also contain other materials such as cement or clay which modify the physical properties of the catalyst, such as its resistance to high temperature steaming.

Alternatively, other conventional carrier materials such as silica-gel may be utilized.

The pellets may be formed by any conventional forming operation such as tableting or extrusion and they may have any desired shape such as cylinders, spheres or rings. If the pellets are to be formed by compression it is usually desirable to employ small amounts of a lubricant such as graphite or aluminum stearate.

If it is desired that the catalyst contain additional molybdenum in excess of that present in the cobalt molybdate, a molybdenum compound such as molybdenum trioxide or a salt which will revert to the oxide upon calcination in air such as ammonium paramolybdate may be mixed with the carrier at the time the cobalt molybdate is incorporated. Alternatively, the additional molybdenum may be added to the catalyst after pelleting and calcination by an impregnation step. A very convenient way of accomplishing this is to effect a simultaneous ammoniation and molybdenum impregnation by dissolving a compound of molybdenum in an aqueous ammonia solution and saturating the pelleted cobalt molybdate containing carrier with such ammoniacal molybdenum solution. Subsequently, the pellets are dried and calcined. I have found that not only is the molybdenum content of the catalyst increased but also that the cobalt molybdate is converted into a high state of activity. In order to accomplish effective ammoniation the ammonia content of the impregnating solution should preferably be in excess of that present in a solution made up from ammonium molybdate and water. I prefer that the ammonia content be between 3 and 17 mols per liter.

Ammoniation may be effected in a number of different ways in addition to the combination molybdenum impregnation and ammoniation described above. It is essential in the ammoniation step to effect intimate contact between ammonium hydroxide and the cobalt molybdate distended upon the carrier, or, to put it another way, between ammonia and the catalytic material in the presence of water. The deliquescence of the activated alumina if it is employed as a carrier material greatly facilitates this and makes it possible, if desired, merely to moisten the calcined pellets with water and then to subject the moist pellets to either vapor or liquid ammonia. Another procedure which is even simpler to follow is to prepare an aqueous ammonia solution, preferably having an ammonia content of between about 3 and about 17 mols per liter, and to spray this solution directly on to the pellets. These above described procedures have the advantage that none of the catalytically active materials are leached out of the pellets by the ammonia solution since it remains in the pellets until evaporated away during the drying step which normally follows ammoniation.

Simple dipping procedures where the pellets are placed in an ammonia solution are also effective, and if the dip is of short duration, little or no leaching will occur. If longer dips are desired because of batch size, it is possible to add small amounts of cobalt and/or molybdenum salts to the ammonia solution. If the molybdenum and cobalt ion concentration of the ammonia solution are high enough, sufficient of these components will be deposited by impregnation to offset any losses due to leaching.

The amount of catalytically active material utilized in the supported catalyst will usually be as little as possible consistent with the required activity to effect a desired reaction. The minimum amount may usually be determined with little difficulty by laboratory scale tests made upon the gas stream to be treated. Generally speaking, the amounts of cobalt, molybdenum and carrier in the catalyst will fall in the ranges of proportions specified below:

| | Percent by weight |
|---|---|
| Cobalt | 1 to 5 |
| Molybdenum | 2 to 20 |
| Carrier | 25 to 97 |

If molybdenum oxide is added in addition to the cobalt molybdate, the mol ratio of molybdenum to cobalt will, of course, be greater than about 1 to 1. In most cases, however, this ratio will be less than 5 to 1.

Certain of the following specific examples disclose in detail how the improved catalysts of my invention may be made in accordance with my new method of manufacture.

*Example 1*

A pelleted cobalt-molybdenum-alumina catalyst was prepared by mechanically mixing the following ingredients in a Simpson intensive mixer for about 15 minutes:

| | Parts by weight |
|---|---|
| Cobalt molybdate, $CoMoO_4 \cdot H_2O$ | 56.7 |
| Molybdenum trioxide, $MoO_3$ | 68 |
| Alumina, $Al_2O_3 \cdot 3H_2O$ | 1200 |
| Graphite | 40 |

Sufficient water was added to the dry materials during mixing to render the mixture suitable for pelleting. It was then formed into ⅛″ by ⅛″ cylindrical pellets and calcined for 16 hours in air at a temperature of 900° F. This calcination effected removal of most of the graphite and converted the alumina to the activated form. One part by weight of these pellets was dipped into four parts by weight of a three molar aqueous ammonia solution for a period of twenty minutes, and the pellets were then removed from the solution and dried. The dried pellets were again calcined in air for 16 hours at a temperature of 900° F.

A batch of these catalyst pellets was placed in a stainless steel tubular reactor surrounded by a jacket space containing heated Dowtherm. The reactor was then filled with hydrogen sulfide gas at atmospheric pressure for a period of two hours during which time the temperature within the reactor was maintained at 700° F. by circulating heated Dowtherm through the jacket space. The purpose of subjecting the catalyst to hydrogen sulfide was to initially sulfide any portions of the catalyst susceptible of taking up sulfur in order to obtain more accurate readings in the following tests of the catalyst's ability to desulfurize a petroleum stock.

A charge of number 2 diesel fuel, having an A.P.I. gravity of about 36.8, a N.P.A. color value of 1.5 and containing about 1400 p.p.m. of organic sulfur, was pumped along with a hydrogen containing gas (90% $H_2$—20% natural gas) through a preheater where the temperature of the mixture was raised to between about 650° F. and 700° F. This heating vaporized the diesel fuel. From the preheater the charge was passed through the catalyst bed in the tubular reactor under a pressure of 300 p.s.i.g., a liquid hourly space velocity of 1, and a hydrogen rate of 1500 standard cubic feet per barrel of feed stock. During passage of the material through the reactor the catalyst bed was maintained at a temperature of 700° F. Four consecutive runs ranging from 6 to 16 hours were made and samples of the effluent gas were obtained from time to time. The average sulfur content in the liquid product which was obtained on cooling the effluent was 144 p.p.m.

At a later date another batch of the same catalyst was placed in the reactor and tested under identical conditions. The sulfur content in a number of samples of the effluent liquid averaged 134 p.p.m. From these tests it is apparent that the catalyst of this invention is a very effective catalyst for the hydrodesulfurization of sour petroleum stocks. The catalyst made in accordance with this example was analyzed in order to determine its composition. The amount of cobalt present, determined as cobalt oxide —CoO—, was 1.2% and the amount of molybdenum present, determined as molybdenum trioxide —$MoO_3$—, was 8.4% by weight.

*Example 2*

Another catalyst was made in accordance with my invention by admixing the following materials using the same procedure as in Example 1:

| | Parts by weight |
|---|---|
| Cobalt-molybdate, $CoMoO_4 \cdot H_2O$ | 115.2 |
| Molybdenum trioxide, $MoO_3$ | 36 |
| Alumina, $Al_2O_3 \cdot 3H_2O$ | 1208 |
| Graphite | 40 |

The mixture was then formed into pellets (3/16 by 3/16 cylinders), and the pellets were calcined in the air for 12 hours at 900° F. The calcined pellets were dipped in a three molar ammonia solution containing 5.4% molybdenum trioxide by weight for 20 minutes, about 1 part by weight of pellets being dipped into 4 parts by weight of solution. The dipped pellets were allowed to dry in air for 8 hours and were then calcined for 12 hours at 900° F. Catalyst made in this manner was analyzed and found to contain 3.15% cobalt, determined as cobalt oxide, and 10.9% molybdenum determined as molybdenum trioxide.

This catalyst was tested in exactly the same manner as the catalyst of Example 1, and the average sulfur content of the liquid product was found to be 114 p.p.m.

Example 3

Alumina trihydrate and cobalt molybdate monohydrate were mixed and formed into pellets in a manner identical to the operations described in Examples 1 and 2. The pellets were calcined for 12 hours at 900° F. and were then dipped in an ammoniacal molybdenum solution for 20 minutes. The solution was prepared by dissolving 495 grams of molybdenum trioxide in 7 liters of water to which had been added 850 milliliters of 17 molar ammonia. The thus dipped pellets were dried and calcined for 16 hours at 900° F. The analysis of the thus formed pellets indicated that their cobalt content, determined as cobalt oxide, was 2.7%, and their molybdenum content, determined as molybdenum trioxide, was 8.7%. A charge of these pellets was placed in the reactor described in Example 1, and a test was made under identical conditions with the same feed material. The liquid product obtained in this test contained on the average of 146 p.p.m. sulfur.

Example 4

A charge of catalyst pellets from the batch described in Example 3 was subjected to a further ammoniation treatment by dipping it in three molar solution for 30 minutes to determine if further ammoniation was beneficial. The thus treated charge was dried and calcined at 900° F. Tests which were identical with those described in the preceding examples were made, and the average sulfur content of the condensed product was 109 p.p.m. A comparison between results of this test and those reported in Example 3 indicates that the further ammoniation had a beneficial effect on the activity of the catalyst.

Example 5

In order to compare the activity of unammoniated catalyst with ammoniated catalyst, a batch of catalyst pellets was formed by mixing the ingredients in solid form in the proportions given in Example 1 was made up. As in Example 1, the pellets were calcined for 16 hours at 900° F. These pellets were analyzed and found to contain 1.7% cobalt, determined as the oxide, and 10.0% molybdenum, determined as trioxide. These pellets were not subjected to an ammoniation treatment but were charged directly into the test reactor and tested under identical conditions with the catalyst of Example 1. The average sulfur content of the liquid product was 444 p.p.m. In distinct contrast it will be noted that the average sulfur content of the product of the test described in Example 1 was only 144 p.p.m. indicating that the ammoniation treatment rendered the catalyst three times as effective as the same catalyst without ammoniation. It should also be noted that the catalyst of this Example 5 contained slightly more of each of the active ingredients than the catalyst of Example 1. This is because the ammonia dip utilized in Example 1 leached some of the cobalt and molybdenum oxides out of the catalyst. This may be avoided by using the non-leaching ammoniation techniques described earlier, of which the following example is typical.

Example 6

A batch of the catalyst pellets identical to those described in Example 5 was ammoniated by spraying it with concentrated (17 molar) ammonium hydroxide with a small atomizer. The amount of the solution sprayed on the pellets was approximately equal to the weight of the pellets. The sprayed pellets were placed in a sealed container for 16 hours, following which they were dried and calcined at 900° F. for 12 hours. None of the cobalt or molybdenum was removed from the pellets by leaching, the respective amounts of those elements being the same as in Example 5. The calcined catalyst was charged into the test reactor and tested under identical conditions as the catalyst of the preceding examples. The average sulfur content of the liquid was 116 p.p.m. A comparison of the results of this example, Example 5 and Example 1 indicates that the method of ammoniation is significant and that in order to achieve a highly active catalyst the ammoniation step must be employed.

Example 7

The following materials were thoroughly mixed and formed into 1/8 inch pellets:

| | Parts by weight |
|---|---|
| Cobalt oxide, CoO | 24 |
| Molybdenum trioxide, $MoO_3$ | 102.2 |
| Alumina, $Al_2O_3 \cdot 3H_2O$ | 1200 |
| Graphite | 40 |

The pellets were calcined in air at 900° F., and analysis showed that the calcined pellets contained 1.98% cobalt oxide and 9.84% molybdenum oxide. The pellets were then spread out on an absorbent material and sprayed with 17 molar ammonia solution. The spraying was continued until all the surfaces were damp, but not wet. The pellets were weighed before and after spraying and were found to have increased in weight 34% after spraying. The sprayed pellets were then calcined at 900° F. for one-half hour. The thus treated pellets were tested in the same manner as the pellets of Example 1 and the liquid product was found to contain 307 p.p.m. of sulfur Other pellets formed and sprayed in the same manner were placed in a sealed container immediately after spraying and remained sealed over night. The next day they were calcined at 900° F. for twelve hours. These pellets were also tested under the conditions described in Example 1. Analysis of the liquid product showed that it contained 311 p.p.m. of sulfur.

From the foregoing data and the results of other tests, it is apparent that ammoniation does not result in greatly increased activity unless one of the materials incorporated in the catalyst before the ammoniation step is cobalt molybdate.

In the foregoing examples the use of the catalyst of this invention in effecting a hydrodesulfurization reaction has been described. The catalyst of this invention is also effective for other mild hydrogenation reactions such as the selective hydrogenation of acetylene in the presence of olefins without hydrogenating more than small amounts of the olefins. Other reactions in which the catalyst of this invention may be employed to advantage will be apparent to those skilled in the art.

Various changes and modifications in the catalyst of this invention and in the novel method of preparation described herein such as will be apparent to those skilled in the art may be made without departing from the spirit of this invention.

What is claimed is:

1. A method of preparing a catalyst which comprises mixing solid particulate cobalt molybdate and solid particulate hydrated alumina in such manner as to achieve uniform distribution of the cobalt molybdate throughout the alumina, forming the mixture into catalyst pellets, calcining the pellets at a temperature sufficiently high to at least partially activate the alumina by driving off water of crystallization, cooling the calcined pellets, ammoniating the cool pellets by contacting them with ammonia in the presence of water, and again calcining the thus ammoniated pellets to drive off the ammonia and water remaining after the ammoniation step.

2. The method of claim 1 wherein the ammoniation step is effected by contacting the pellets with an aqueous solution containing ammonia in such amount that the ammonia concentration of the solution is between about 3 and 17 molar.

3. The method of claim 1 wherein the ammoniation step is effected by moistening the pellets and contacting the moistened pellets with ammonia.

4. The method of claim 1 wherein the ingredients employed in forming the catalyst pellets are present in such amounts that the pellets contain:

| | Percent by weight |
|---|---|
| Cobalt | 1 to 5 |
| Molybdenum | 2 to 20 |
| Alumina | 25 to 97 |

5. The method of claim 1 wherein molybdenum trioxide is admixed with the alumina and cobalt molybdate prior to forming the mixture into pellets.

6. The method of claim 2 wherein the aqueous solution containing ammonia also contains molybdenum trioxide.

7. The method of claim 2 wherein molybdenum trioxide is admixed with the alumina and cobalt molybdate prior to forming the mixture into pellets and the aqueous solution containing ammonia also contains a soluble molybdenum compound.

8. The method of claim 4 wherein the mol ratio of molybdenum to cobalt in the pellets is between about one and about five.

9. The method of claim 6 wherein the pellets are subjected to a further ammoniation and calcining after being contacted by the molybdenum trioxide containing ammonia solution.

10. A method of preparing a pelleted catalyst which comprises mixing cobalt molybdate and an absorbent alumina to achieve uniform distribution of the cobalt molybdate throughout the alumina, compressing and shaping the mixture to form catalyst pellets, contacting said pellets with ammonia in the presence of water to activate the cobalt molybdate, and calcining the thus treated pellets at a sufficiently high temperature to drive off the ammonia and water remaining after the foregoing ammoniation step.

References Cited in the file of this patent

UNITED STATES PATENTS

| | | |
|---|---|---|
| 1,904,218 | Franceway | Apr. 18, 1933 |
| 2,204,193 | Spicer et al. | June 11, 1940 |
| 2,393,288 | Byrns | Jan. 22, 1946 |
| 2,573,726 | Porter et al. | Nov. 6, 1951 |
| 2,686,763 | Johnston et al. | Aug. 17, 1954 |
| 2,690,433 | Engel et al. | Sept. 28, 1954 |
| 2,755,257 | Donovan et al. | July 17, 1956 |